(12) United States Patent
Abhishek et al.

(10) Patent No.: US 7,426,550 B2
(45) Date of Patent: Sep. 16, 2008

(54) EXTENSIBLE WIRELESS FRAMEWORK

(75) Inventors: Abhishek Abhishek, Woodinville, WA (US); Francis Duong, Bellevue, WA (US); Shai Guday, Redmond, WA (US); Anton Krantz, Kirkland, WA (US); Jiandong Ruan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/930,684

(22) Filed: Aug. 31, 2004

(65) Prior Publication Data

US 2005/0182830 A1 Aug. 18, 2005

Related U.S. Application Data

(60) Provisional application No. 60/544,900, filed on Feb. 13, 2004.

(51) Int. Cl.
*G06F 15/177* (2006.01)
(52) U.S. Cl. .............. 709/220; 709/224; 709/227; 709/230; 455/410; 713/155
(58) Field of Classification Search ......... 709/223–224, 709/227, 230, 220; 455/411, 432.1, 462.3, 455/410; 713/155
See application file for complete search history.

(56) References Cited

U.S. PATENT DOCUMENTS

| | | | | |
|---|---|---|---|---|
| 5,446,736 | A * | 8/1995 | Gleeson et al. | 370/473 |
| 5,627,829 | A * | 5/1997 | Gleeson et al. | 370/230 |
| 6,295,645 | B1 * | 9/2001 | Brewer | 717/178 |
| 2002/0078365 | A1 * | 6/2002 | Burnett et al. | 713/200 |
| 2003/0114153 | A1 * | 6/2003 | Shaver et al. | 455/424 |
| 2003/0165130 | A1 * | 9/2003 | Wodzianek et al. | 370/338 |
| 2004/0078597 | A1 * | 4/2004 | Sun et al. | 713/201 |
| 2004/0103278 | A1 * | 5/2004 | Abhishek et al. | 713/160 |
| 2004/0185845 | A1 * | 9/2004 | Abhishek et al. | 455/422.1 |
| 2004/0240412 | A1 * | 12/2004 | Winget | 370/331 |
| 2005/0010755 | A1 * | 1/2005 | Sheth et al. | 713/155 |
| 2005/0048320 | A1 | 3/2005 | Kobayashi | |
| 2005/0071476 | A1 * | 3/2005 | Tejaswini et al. | 709/227 |
| 2005/0101293 | A1 * | 5/2005 | Mentze et al. | 455/410 |

OTHER PUBLICATIONS

Blunk L. et al., PPP Extensible Authentication Protocol (EAP), RFC 2248, Mar. 1998.*

(Continued)

*Primary Examiner*—Oanh Duong
(74) *Attorney, Agent, or Firm*—Perkins Coie LLP

(57) ABSTRACT

An extensible wireless framework for connecting to a wireless network is provided. The extensible wireless framework includes a network roaming service with a registration component and a network service component. The registration component registers extensible service modules and extensible drivers for providing non-standard (i.e., extensible) capabilities to the wireless network. The extensible service module provides a service not provided by a native component of the extensible wireless framework, and the extensible driver may implement a media access control sub-layer of a wireless network protocol and provide a media access control interface. The network service component identifies available wireless networks, selects to join the wireless network when available, requests the extensible driver for the wireless network via its media access control interface to connect to the selected network, and notifies the extensible service module to provide services to the extensible driver.

31 Claims, 7 Drawing Sheets

OTHER PUBLICATIONS

Aboba B. et al., Extensible Authentication Procol (EAP), RFC 3748, Jun. 2004.*

"Part 11: Wireless LAN Medium Access Control (MAC) and Physical Layer (PHY) specifications," International Standard ISO/IEC 8802-11, ANSI/IEEE Std 802.11, 1999, 531 pages.

"Network Driver Interface Specification—NDIS 5.0 Overview," Microsoft Windows White Paper, Copyright Microsoft Corporation 2004, updated Dec. 4, 2001 (7 pages) http://www.microsoft.com/whdc/archive/ndis5.mspx?pf=true.

Mackie, Kurt, "Cisco's CCX: Industry Broadside or Much Ado About Nothing?," Broadband Wireless Online, Mar. 3, 2003 (3 pages) http://www.shorecliffcommunications.com/magazine/print_news=1273.

* cited by examiner

EXTENSIBLE WIRELESS FRAMEWORK

CROSS-REFERENCE TO RELATED APPLICATION(S)

This application claims the benefit of U.S. Provisional Application No. 60/544,900, entitled "Extensible Wireless Framework" and filed on Feb. 13, 2004, which is hereby incorporated by reference.

TECHNICAL FIELD

The described technology relates generally to wireless networks.

BACKGROUND

The seven-layer OSI network model defines a data link layer and a physical (PHY) layer as the two lowest layers. The data link layer encodes and decodes packets into bits and handles errors in the physical layer, flow control, and frame synchronization. The data link layer is divided into a logical link control (LLC) sub-layer and a media access control (MAC) sub-layer. The LLC sub-layer controls frame synchronization, flow control, and error checking. The MAC sub-layer controls how a computer on the network gains access to the data and permission to transmit. The MAC sub-layer provides a set of rules to determine how to access the transmission medium and transmit data. The physical layer, however, is responsible for physically transmitting and receiving the data.

The IEEE 802.11 specification defines a MAC sub-layer and a physical layer for a wireless network. An 802.11 network consists of a distribution system, access points, a wireless medium, and stations. An individual station, such as a laptop computer, gains access to the network by communicating over the wireless medium via an access point (assuming an infrastructure network). The distribution system connects the access points together so that information can flow from a station communicating with one access point to a station communicating with another access point. In order to connect to a network, a station may actively scan for available networks by sending out probe requests. Alternatively, a station may passively tune to different channels waiting for an access point beacon. The station may then compile a report of networks and may elect to join one of the networks. Once the station elects to join a network, it authenticates itself to the network and then associates with an access point of the network. (Many 802.11 networks allow any station with access to the network to be authenticated prior to association referred to as "open authentication," but require additional authentication after association by using, for example, an extensible authentication protocol ("EAP")). Each station "associates" with one access point through which it gains access to the network. In the process of associating, the unique MAC address of the station is recorded with the access point so that the distribution network knows through which access point to route data destined for the station. Since stations connected to a wireless network may be mobile, a station will need to associate with a new access point when it moves out of range of the access point to which it is currently associated (or for some other reason wants to associate with another access point). A station that moves out of range of its associated access point sends a request to associate with a new access point and receives the identification of the new access point with which to associate in response. The distribution system ensures that the transmission of data occurs seamlessly as stations re-associate with new access points.

At least one operating system currently provides a native wireless framework for connecting to wireless networks such as an 802.11 network. The native wireless framework provides capabilities to identify available wireless networks and select an appropriate wireless network for joining. Once associated with an access point of a network, the native wireless framework controls the communications over the wireless network. When a computing device with such an operating system is moved from location-to-location (i.e., roams), the native wireless framework from time-to-time associates with an appropriate access point of the wireless network. A native wireless framework is described in U.S. patent application Ser. No. 10/306,169, entitled "Native WiFi Architecture for 802.11 Networks" and filed on Nov. 27, 2002, which is hereby incorporated by references.

The developer of a native wireless framework may try to include as many capabilities as the wireless network industry may need at the time. The wireless network industry is, however, rapidly evolving. New capabilities driven by new standards or innovations are constantly being developed by independent hardware vendors ("IHVs") and independent software vendors ("ISVs"). These developments may occur at a much faster pace than the release of new versions of the operating system. As a result, when vendors want to use capabilities of a wireless network that are not currently supported by an operating system, they typically develop a monolithic implementation that subsumes some or all of the capabilities of the native wireless framework or any other wireless framework. Because each vendor provides its own implementation, the implementations are often inconsistent with each other. This inconsistency makes it difficult for users to take advantage of these new capabilities. Moreover, these monolithic implementations may not integrate well, or at all, with the native wireless framework. As a result, advanced capabilities of the native wireless framework, such as diagnostics, cannot interface with the monolithic implementations. Such advanced capabilities thus appear to the users to not be functioning as intended or do not operate in a consistent or diagnosable way. In addition, these monolithic implementations do not take advantage of the capabilities of the native wireless framework and may duplicate such capabilities.

It would be desirable to have a wireless framework that would allow vendors to develop new capabilities at their own pace while not hindering the overall capabilities of the native wireless framework.

SUMMARY

An extensible wireless framework for connecting to a wireless network is provided. The extensible wireless framework may provide a registration component and a network service component. The registration component registers or in some other way identifies extensible service modules and extensible drivers for providing non-standard (i.e., extensible) capabilities to the wireless network. The extensible service module provides a service not provided by a native component of the extensible wireless framework, and the extensible driver may implement a media access control sub-layer of a wireless network protocol and provide a media access control interface. The network service component identifies available wireless networks, selects to join the wireless network when available, requests the extensible driver for the wireless network via its media access control interface to connect to the selected network, and notifies the extensible service module to provide services to the extensible driver.

DETAILED DESCRIPTION

An extensible wireless framework that allows third-party components to be installed into and integrate with native wireless components is provided. The extensible wireless framework may support standards such as IEEE 802.11, IEEE 802.15.3a, and IEEE 802.16a, which define wireless technologies for LAN (Wi-Fi), PAN (UWB), and MAN (Wi-Max) communications, respectively. The extensible wireless framework provides a mechanism for vendors to leverage core capabilities of the native wireless components and to install early implementations of new capabilities at their own pace. In addition, because the extensible wireless framework is integrated with the third-party components, the extensible wireless framework can monitor the processing and state of third-party components.

In one embodiment, the extensible wireless framework allows vendors to install their own kernel-mode, extensible drivers and to install user-mode plug-ins. The plug-ins can perform various functions such as configuring profile information (e.g., configuration and authentication information) for non-standard profiles of the wireless network and performing client authentication. The components of the extensible wireless framework control the storing of the configuration and authentication information of vendor plug-ins, the selecting of the wireless network for establishing a connection, and the establishing of the connection, and monitor the ongoing communications via the extensible drivers.

Figure 1:
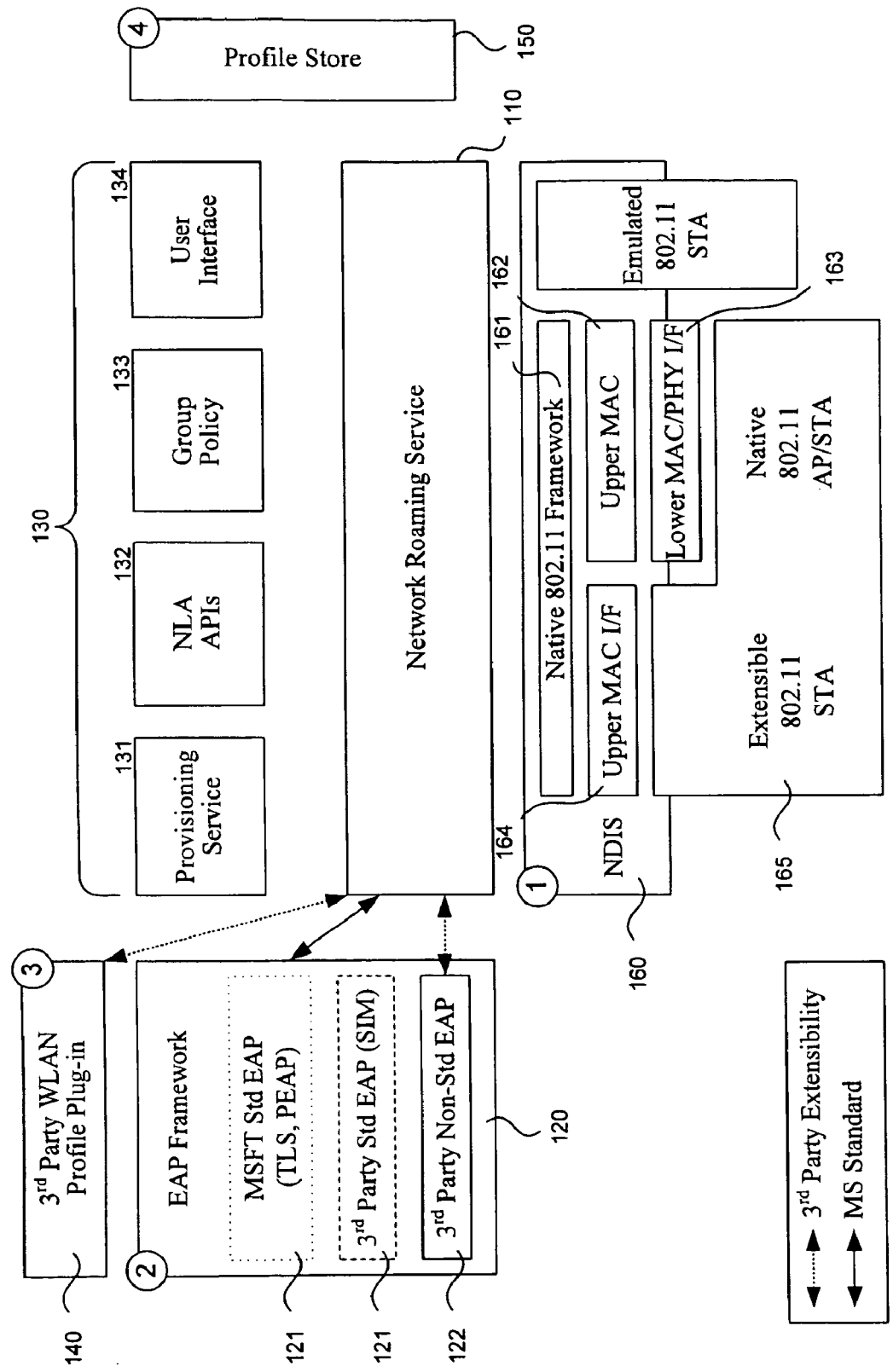
FIG. 1 is a block diagram that illustrates a system architecture of an extensible wireless framework in one embodiment.

FIG. 1 is a block diagram that illustrates a system architecture of an extensible wireless framework in one embodiment. The extensible wireless framework allows extensible components (e.g., plug-ins and drivers) to be installed to handle non-standard protocols of wireless networks. The extensible wireless framework includes a network roaming service 110, an extensible authentication protocol ("EAP") framework component 120, administrative components 130, a vendor profile plug-in component 140, a profile store 150, and a network driver interface specification ("NDIS") component 160. Components 110, 120, 130, and 140 operate in user mode, and component 160 operates in kernel mode.

The network roaming service may provide a registration component and network service component. The registration component allows vendor (i.e., third-party) profile plug-ins such as extensible driver and extensible user interfaces to register with it. (Alternatively, a third-party component can use a client-side library provided by the extensible wireless framework to identify its services.) The network service component provides a rule-base selection of a wireless network, controls the establishment of a connection to the selected wireless network by interfacing with the extensible driver, and interfaces with a vendor, non-standard EAP plug-in to provide authentication services when the selected wireless network is non-standard. A rule-based roaming technique is described in U.S. patent application Ser. No. 10/693,655, entitled "Network and Interface Selection on a Computing Device Capable of Establishing Connections via Multiple Network Communications Media" and filed on Oct. 24, 2003, which is hereby incorporated by reference.

The EAP framework component includes various standard EAP components 121 and a vendor, non-standard EAP plug-in 122. The standard EAP components may be implemented natively or implemented by a third party using the standard EAP framework such as EAP Subscriber Identity Module ("EAP-SIM"). The standard EAP components provide only standard EAP capabilities (whether implemented natively or by a third party), and the network roaming service interacts with them directly to coordinate the authentication process. The vendor, non-standard EAP plug-in provides non-standard EAP capabilities in an EAP framework with which the network roaming service interacts after the plug-in is registered.

The administrative components include a provisioning component 131, an NLA API component 132, a group policy component 133, and a user interface component 134, which are described in U.S. patent application Ser. No. 10/306,169, entitled "Native WiFi Architecture for 802.11 Networks."

The vendor profile plug-in controls registering of the plug-in and setting of its profile information for non-standard network profiles such as Cisco-compatible extensions ("CCX"), the Wired Authentication and Privacy Infrastructure ("WAPI"), and so on. The vendor profile plug-in may provide a user interface for receiving configuration and authentication information from a user. The plug-in provides its configuration and authentication information to the network roaming service for storage as profile information in the profile store to be used when establishing a connection to a non-standard wireless network.

The NDIS component includes a native 802.11 framework 161, an upper MAC component 162, a lower MAC/PHY interface 163, an upper MAC interface 164, and a W802.11 miniport driver 165. The miniport driver includes a native 802.11 AP/STA driver (that can function as an access point on a station) and an extensible 802.11 STA driver that can provide native-only and/or extensible-only functionality. The miniport driver can be configured to select either the native or extensible driver to control access to the wireless network.

The native 802.11 framework is an intermediate driver that provides a framework for driving the 802.11 operations of the 802.11 miniport driver. It provides an interface between the user-mode components and the kernel-mode components. It interacts with the network roaming service to provide network port-based access control.

The upper MAC interface provides an interface for controlling the upper MAC operations of an extensible 802.11 STA driver. It also provides upper MAC state management for diagnostic data and monitoring the progress of upper MAC procedures.

The lower MAC/PHY interface provides an interface for controlling the 802.11 lower MAC and PHY operations needed for the purpose of hosting the upper MAC natively within the extensible wireless framework.

The native 802.11 AP/STA driver conforms to the lower MAC/PHY interface specifications. It may conform to both the AP and STA interfaces. Alternatively, it may provide only a subset of the AP or STA interfaces. The native 802.11 AP/STA driver may be provided by an IHV who needs only the capabilities provided by the native components of the extensible wireless framework.

The extensible 802.11 STA driver is provided by vendor who wants to provide capabilities not provided by the native components of the extensible wireless framework. This driver conforms to the upper MAC interface specification of the extensible wireless framework. The 802.11 upper and lower MAC and the PHY implementations are provided by the extensible 802.11 STA driver.

A vendor who needs capabilities not provided by the native components of the extensible wireless framework can provide an extensible 802.11 STA driver and may also provide a profile plug-in and a non-standard EAP plug-in that provides the needed capabilities in the context of the extensible wireless framework. The extensible wireless framework can be used by a vendor who wants to provide new capabilities only in kernel mode. The new capabilities may be an early implementation of a new standard such as 802.11n. In such a case, the vendor need only implement and install the appropriate extensible 802.11 STA driver. The vendor may, however, provide user made capabilities (e.g., enhanced authentication) by providing a profile plug-in and a service plug-in such as a non-standard EAP plug-in.

Figure 2:
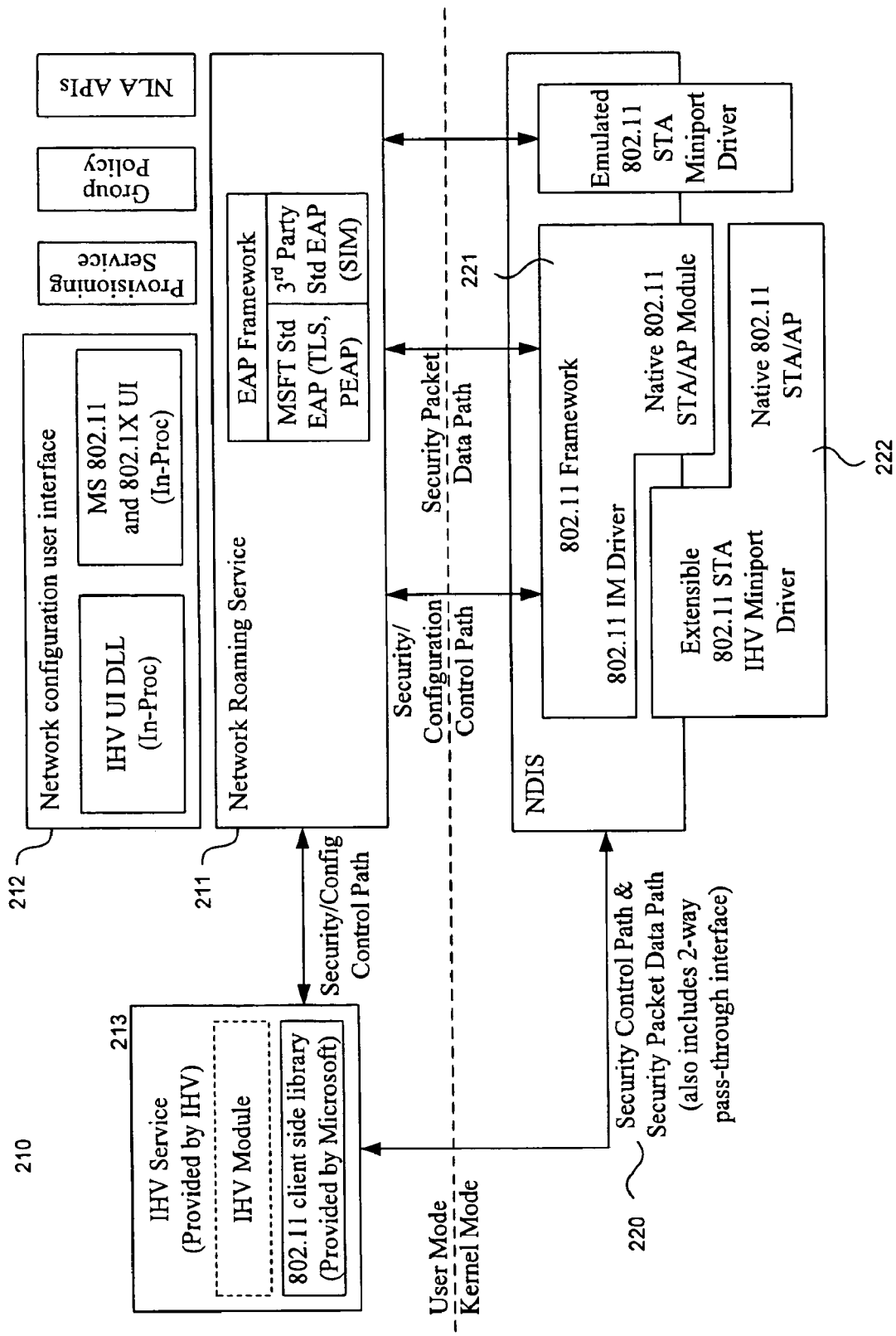
FIG. 2 is a block diagram that illustrates a software architecture of an extensible wireless framework in one embodiment.

FIG. 2 is a block diagram that illustrates a software architecture of an extensible wireless framework in one embodiment. The software architecture includes user-mode components 210 and kernel-mode components 220. The user-mode components include a network roaming service 211, a network configuration user interface 212, and an IHV service 213, which may each execute as separate processes. The kernel-mode components include an 802.11 framework 221 and a miniport driver 222. An IHV UI DLL 215 is loaded as a dynamic link library within the process of the network configuration user interface. The IHV service includes an IHV module provided by a vendor and a client-side library provided by the native environment. The client-side library provides an application programming interface through which the IHV module that provides a vendor-specific service can send data to and receive data from the 802.11 framework bypassing the network roaming service. The network roaming service provides standard EAP functions and coordinates the interaction between the IHV UI DLL, the IHV service, and the IHV miniport driver.

Figure 3:
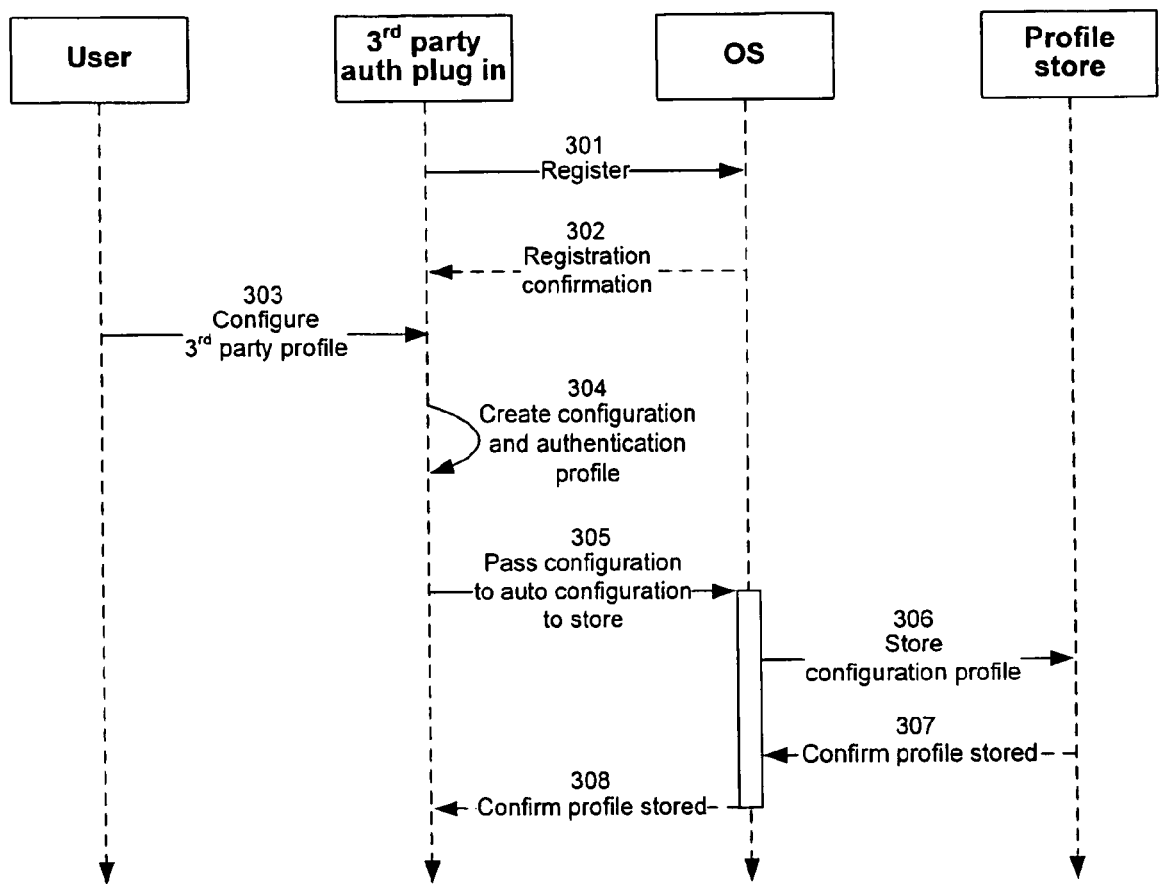
FIG. 3 is a sequence diagram that illustrates the registering of a vendor profile plug-in and the setting of its profile information in one embodiment.

FIG. 3 is a sequence diagram that illustrates the registering of a vendor profile plug-in and the setting of its profile information in one embodiment. When a vendor profile plug-in is initially installed, it registers 301 with the network roaming service. The vendor profile plug-in could also register the non-standard EAP plug-in. The network roaming service ensures that the plug-in conforms with requirements of such a plug-in and confirms 302 the registration of the plug-in. A user can then provide 303 the vendor profile information via a user interface provided by the vendor. Alternatively, the user interface could be provided as an additional property page of the existing wireless property pages. The plug-in creates 304 the profile information, which may include configuration and authentication information. The plug-in sends 305 the profile information to the network roaming service, which stores 306 the profile information in the profile store. When the profile store confirms 307 that the information has been stored, the network roaming service confirms 308 to the plug-in that the information has been stored.

FIGS. 4-7 illustrate interaction sequences between the network roaming service and the IHV components when the network is in infrastructure mode. One skilled in the art will appreciate that sequences would be performed when the network is in ad hoc mode.

Figure 4:
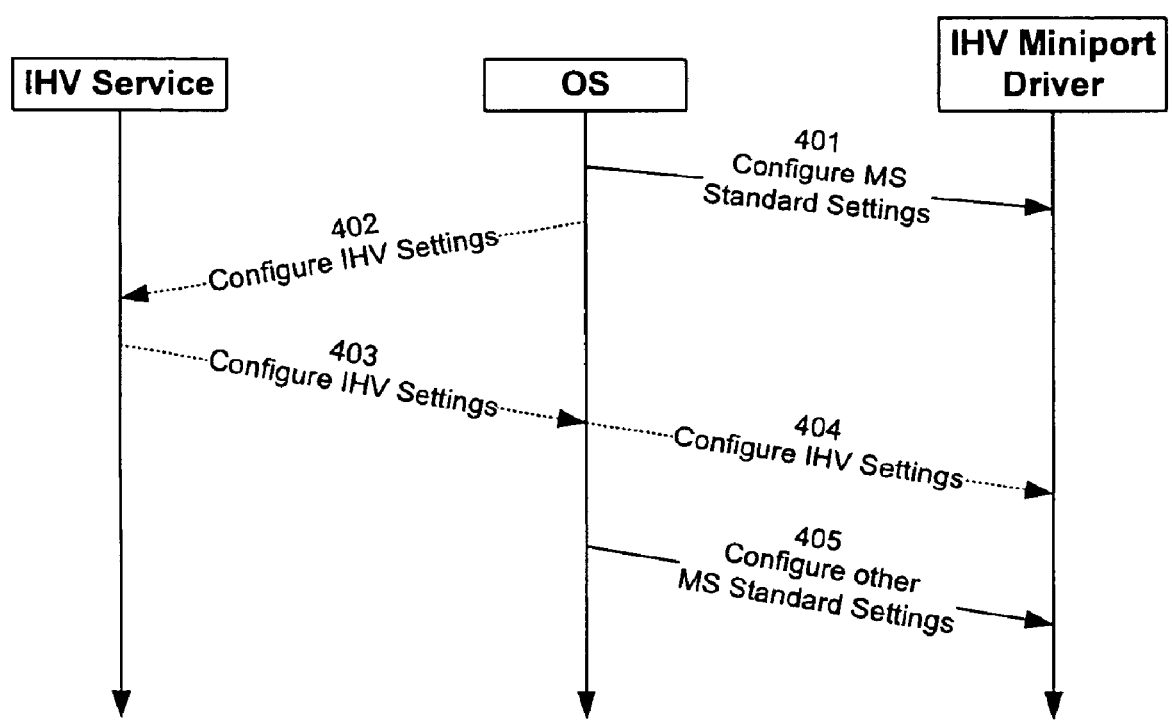
FIG. 4 is a sequence diagram that illustrates messages sent when configuring a network profile in one embodiment.

FIG. 4 is a sequence diagram that illustrates messages sent when configuring a network profile in one embodiment. The operating system initially provides 401 standard configuration settings (e.g., network type and network service set identifier ("SSID")) to the IHV miniport driver from the network roaming service via the 802.11 framework. If an IHV module has been installed, then the network roaming service retrieves from the profile store the configuration data for the IHV module and provides 402 the configuration data to the IHV service. The IHV service identifies the appropriate IHV configuration setting and provides 403 them to the network roaming service. The network roaming service then provides 404 the identified IHV configuration settings to the IHV miniport driver via the 802.11 framework. This allows the IHV miniport driver to have an IHV-specific configuration. The network roaming service then provides 405 additional standard configuration settings (e.g., a packet exemption list to exempt certain types of packets from encryption) to the IHV miniport driver via the 802.11 framework.

Figure 5:
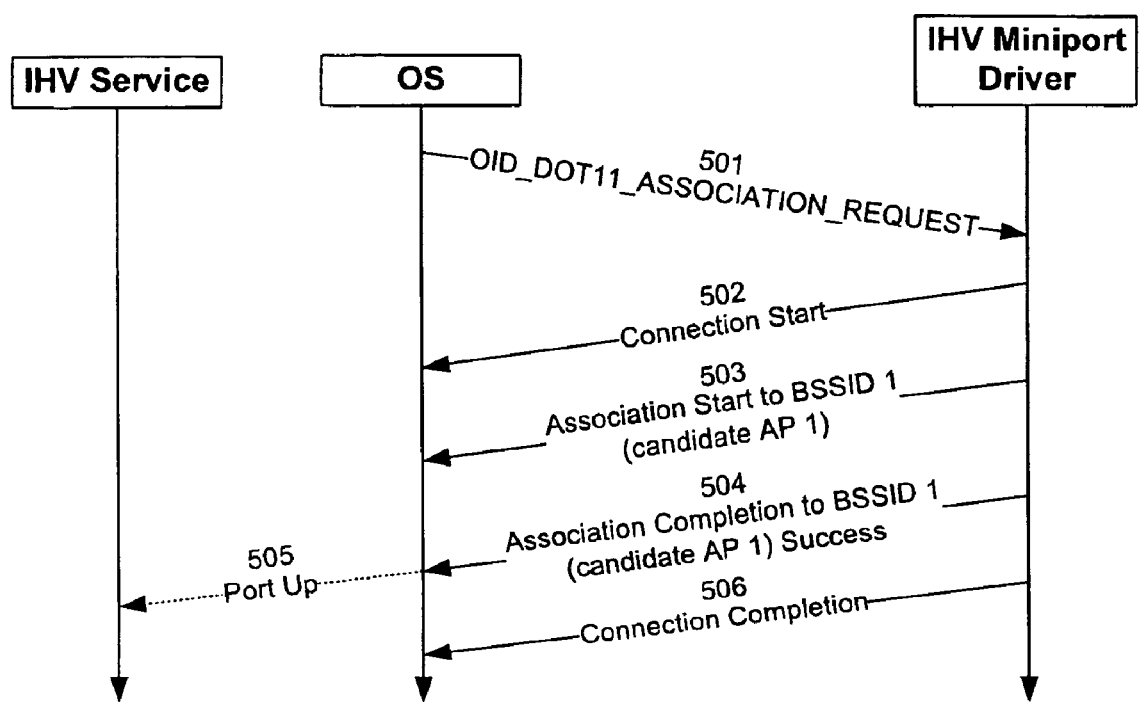
FIG. 5 is a sequence diagram that illustrates messages sent when connecting to an infrastructure network in one embodiment.

FIG. 5 is a sequence diagram that illustrates messages sent when associating with an access point of an infrastructure network in one embodiment. The network roaming service provides 501 an associate request to the IHV miniport driver. In response, the IHV miniport driver provides 502 a connection start message to the network roaming service. The IHV miniport driver forms a list of candidate access points and tries to associate with an access point in the list. The IHV miniport driver provides 503 to the network roaming service a message indicating that it is attempting to associate with an access point. The IHV miniport driver may then perform authentication. When the association is complete, the IHV miniport driver provides 504 to the network roaming service a message indicating that is has completed the association. The IHV miniport driver may also provide a failure message when an association is unsuccessful. In which case, the IHV miniport driver would select another access point and provide another message to the network roaming service indicating that the driver is attempting to associate. Upon successful association, the network roaming service provides 505 to the IHV service a message indicating that the port of the IHV miniport driver is up. When the connection has been completed, the IHV miniport driver provides 506 to the network roaming service a message indicating completion.

Figure 6:
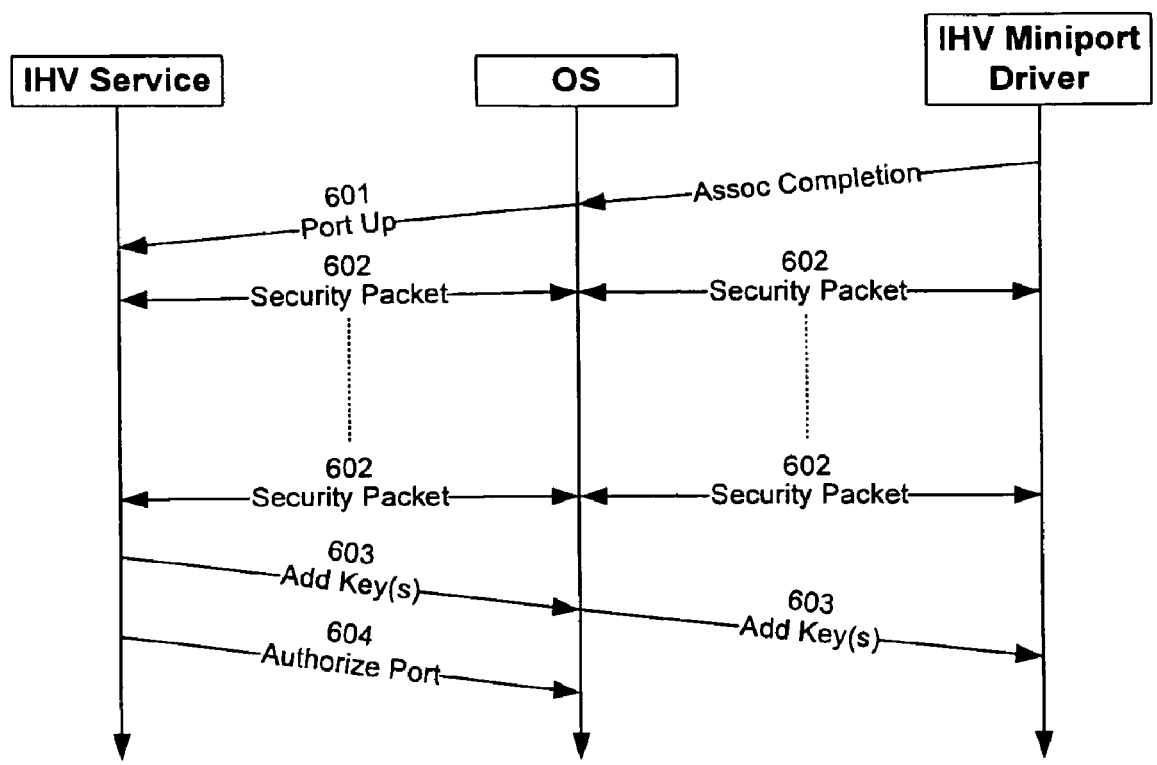
FIG. 6 is a sequence of diagram messages sent when a port authenticates to the network in one embodiment.

FIG. 6 is a sequence diagram of messages sent when a port authenticates to the network after association in one embodiment. When the IHV service has provided 601 with a port up message, it starts its custom security process by exchanging security packets with the associated access point. The IHV service sends and receives 602 security packets via the client-side library directly to the 802.11 framework. This exchange of messages is defined by the IHV who wants to extend the security capabilities of the native components of the extensible wireless framework. After port authentication is complete, the IHV service provides 603 encryption keys, which are sent to the IHV miniport driver for encrypting data that is sent to the associated access point. The IHV service then notifies 604 the native 802.11 framework that the port is open. Once the port is opened, the native 802.11 framework allows normal data packets to pass through to the IHV miniport driver where it is encrypted and forwarded to the access point. The network roaming service may provide a port down message to the IHV service when the port goes down so that it can clean up any state information relating to the port.

Figure 7:
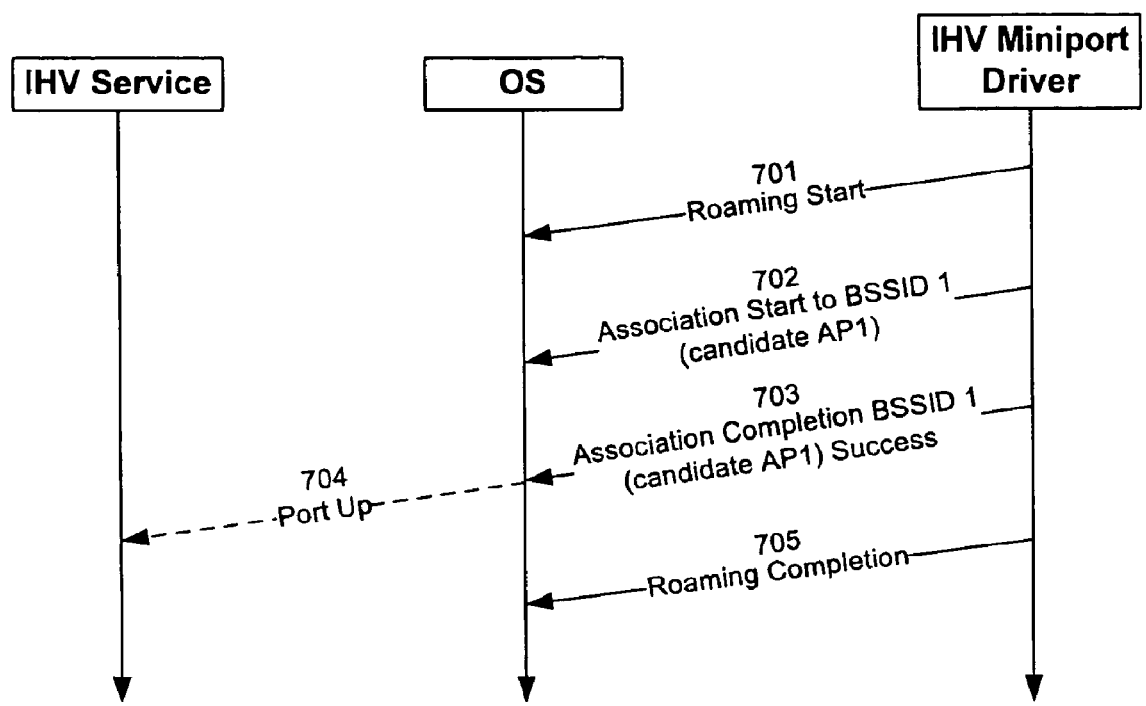
FIG. 7 is a sequence diagram that illustrates messages sent when a station roams within an infrastructure network in one embodiment.

FIG. 7 is a sequence diagram that illustrates messages sent when a station roams within an infrastructure network in one embodiment. When the IHV miniport driver decides to roam, it provides 701 a message to the network roaming service. The IHV miniport driver forms a list of candidate access points and tries to associate with an access point in the list. The IHV miniport driver provides 702 to the network roaming service a message indicating that it is attempting to associate with an access point. When the association is complete, the IHV miniport driver provides 703 to the network roaming service a message indicating that is has completed an association. Upon successful association, the network roaming service provides 704 to the IHV service a message indicating that the port of the IHV miniport driver is up. When the roaming has been completed, the IHV miniport driver provides 705 to the network roaming service a message indicating the completion. Upon receiving a port up message, the IHV service may start the authentication process as described above.

The computing device on which the extensible wireless framework is implemented may include a central processing unit, memory, input devices (e.g., keyboard and pointing devices), output devices (e.g., display devices), and storage devices (e.g., disk drives). The memory and storage devices are computer-readable media that may contain instructions that implement the extensible wireless framework. In addition, the data structures and message structures may be stored or transmitted via a data transmission medium, such as a signal on a communications link. Various communications links may be used, such as the Internet, a local area network, a wide area network, or a point-to-point dial-up connection.

The extensible wireless framework may be implemented in various environments. The described environment is only one example of a suitable operating environment and is not intended to suggest any limitation as to the scope of use or functionality of the extensible wireless framework. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The extensible wireless framework may be described in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

One skilled in the art will appreciate that although specific embodiments of the extensible wireless framework have been described herein for purposes of illustration, various modifications may be made without deviating from the spirit and scope of the invention. Accordingly, the invention is not limited except by the appended claims.

We claim:

1. An extensible wireless framework embedded in a computer-readable storage medium, when executed by one or more computers, for connecting to a wireless network, comprising:
    a registration component that registers an extensible service module and an extensible driver for the wireless network, the extensible service module providing a service not provided by a native component of the extensible wireless framework, the extensible driver implementing a media access control sub-layer of a wireless network protocol and that provides a media access control interface; and
    a network service component that identifies available wireless networks, selects to join the wireless network when available, requests the extensible driver for the wireless network via said media access control interface to connect to the selected network, and notifies the extensible service module to provide services to the extensible driver.

2. The extensible wireless framework of claim 1 wherein the network is an 802.11 network.

3. The extensible wireless framework of claim 1 wherein the extensible service module provides an authentication service.

4. The extensible wireless framework of claim 1 wherein when the extensible service module is notified to provide services to the extensible driver, the extensible service module bypasses the network service component when providing the services.

5. The extensible wireless framework of claim 1 wherein when the extensible service module is notified to provide services to the extensible driver, the extensible service module uses the network service component as an intermediary to communicate with the extensible driver.

6. The extensible wireless framework of claim 1 wherein the registration component registers an extensible user interface for use in inputting from a user data for providing the service of the extensible service module.

7. The extensible wireless framework of claim 1 wherein the registration component stores information for use by the extensible wireless framework.

8. The extensible wireless framework of claim 1 wherein a single miniport driver provides the extensible driver and a native driver and wherein selection of either the extensible driver or the native driver is configurable.

9. The extensible wireless framework of claim 1 wherein the registration and network service component execute in user mode and the extensible driver executes in kernel mode.

10. The extensible wireless framework of claim 1 including a native framework component and intermediate driver that provides an interface between the network service component and the extensible driver.

11. The extensible wireless framework of claim 10 wherein the native framework component interacts with the extensible driver via extensible driver's upper media access control (MAC) interface.

12. The extensible wireless framework of claim 10 wherein the native framework component implements an upper media access control portion of the media access control sub-layer and interacts with a native driver via an lower media access control interface.

13. The extensible wireless framework of claim 1 wherein the extensible service module provides an authentication service, wherein when the extensible service module is notified to provide services to the extensible driver, the extensible service module bypasses the network service component when providing the services, and wherein the registration component registers a extensible user interface for use in inputting from a user data for providing the service of the extensible service module.

14. The extensible wireless framework of claim 13 wherein the network is an 802.11 network.

15. The extensible wireless framework of claim 1 wherein the extensible service module provides services not provided by extensible wireless framework.

16. A computer-readable medium containing instructions for controlling a computer system to provide an extensible wireless framework for connecting to a wireless network, the instructions including:
  a registration component that registers an extensible user interface, an extensible service module, and an extensible driver for the wireless network, the extensible service module providing a service not provided by a native component of the extensible wireless framework, the extensible user interface for inputting from a user data for providing the service of the extensible service module, the extensible driver implementing a portion of a wireless network protocol for the wireless network; and
  a network service component that identifies available wireless networks, selects to join the wireless network when available, requests the extensible driver to connect to the selected wireless network, notifies the extensible service module to provide services to the extensible driver, and provides information to the extensible service module that was input from a user via the extensible user interface.

17. The computer-readable medium of claim 16 wherein the network is an 802.11 network.

18. The computer-readable medium of claim 16 wherein the extensible service module provides an authentication service.

19. The computer-readable medium of claim 16 wherein when the extensible service module is notified to provide services to the extensible driver, the extensible service module bypasses the network service component when providing the services.

20. The computer-readable medium of claim 16 wherein when the extensible service module is notified to provide services to the extensible driver, the extensible service module uses the network service component as an intermediary to communicate with the extensible driver.

21. The computer-readable medium of claim 16 wherein the registration component inputs from a user via the extensible user interface information for providing the service of the extensible service module.

22. The computer-readable medium of claim 21 wherein the registration component stores the input information for use by the network service component.

23. The computer-readable medium of claim 22 wherein the network service component stores the information in a profile store.

24. The computer-readable medium of claim 16 wherein a single miniport driver provides the extensible driver and a native driver and wherein selection of either the extensible driver or the native driver is configurable.

25. The computer-readable medium of claim 16 wherein the registration and network service component execute in user mode and the extensible driver executes in kernel mode.

26. The computer-readable medium of claim 16 including a native framework component that provides an interface between the network service component and the extensible driver.

27. The computer-readable medium of claim 26 wherein the portion of the wireless network protocol is a media access control sub-layer and wherein the extensible driver provides a media access control interface to the media access control sub-layer.

28. The computer-readable medium of claim 27 wherein the native framework component interacts with the extensible driver via its upper media access interface.

29. The computer-readable medium of claim 28 wherein the native framework component implements an upper media access control portion of the media access control sub-layer and interacts with a native driver via an lower media access control interface.

30. The computer-readable medium of claim 16 wherein the extensible service module provides an authentication service, wherein when the extensible service module is notified to provide services to the extensible driver, the extensible service module bypasses the network service component when providing the services, and wherein the network is an 802.11 network.

31. The computer-readable medium of claim 30 wherein the portion of the wireless network protocol is a media access control sub-layer and wherein the extensible driver provides a media access control interface to the media access control sub-layer.

* * * * *